Sept. 6, 1949.  W. G. CELVA  2,481,081
MEANS FOR ALIGNING TYPE-PALLETS
Filed July 6, 1946

INVENTOR
W. G. Celva
BY John McElene
ATTORNEY

Patented Sept. 6, 1949

2,481,081

UNITED STATES PATENT OFFICE 2,481,081

MEANS FOR ALIGNING TYPE PALLETS

Walter Gustav Celva, Denver, Colo., assignor to American Telephone and Telegraph Company, a corporation of New York Application July 6, 1946, Serial No. 681,746

9 Claims. (Cl. 113—99)

This invention relates to means for aligning type-pallets during the process of soldering the pallets to the type-bars of a teletypewriter or other similar writing machine in which they are employed.

In the maintenance of teletypewriters it is sometimes necessary to replace type-pallets either because of damage or wear, or to provide a different symbol of character that may be required for the special service in which the teletypewriter is employed. Obviously, it is necessary to so position the new type-pallet upon the type-bar that the character printed by that type-pallet will be in alignment with the other printed characters of the teletypewriter. Heretofore, pliers of various types were employed to bend the type-bars (after the pallets had been soldered thereto) in order to bring the printed characters in proper alignment upon the paper, but for obvious reasons such methods were unsatisfactory. The object of the present invention is to position the type-pallet upon the type-bar prior to soldering it thereto, and to hold the pallet and type-bar fixedly in the proper relationship during the soldering process so that the characters upon the type-pallet, when printed, will be in alignment with the other printed characters of the teletypewriter.

Figure 2:
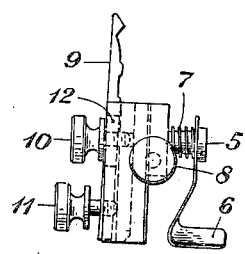
Figure 1:
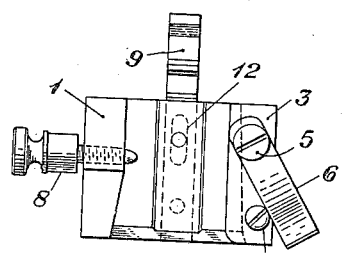
Figure 3:
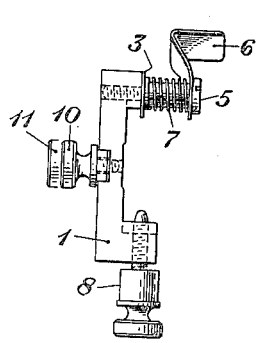
Figure 4:
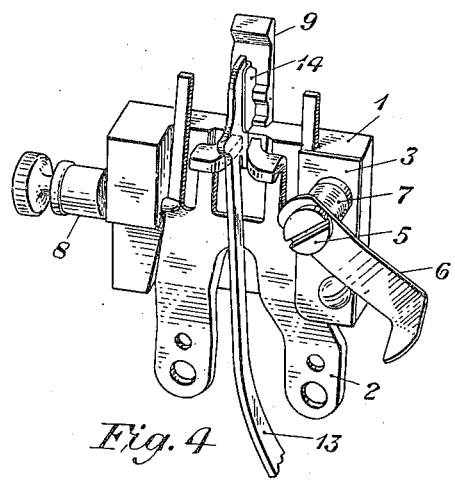

This invention will be fully understood from the following description when read in connection with the drawing of which Figures 1, 2 and 3 are front, side and top views respectively of the aligning jig in which the present invention is embodied and Fig. 4 is an isometric view of the jig attached to the type-bar guide that is a part of the present standard teletypewriter.

The jig consists of a base 1 made preferably of aluminum or other light metal and, as shown clearly in Fig. 3, the face of the base is slotted in order to fit over the type-bar guide 2 as shown in Fig. 4. A plate 3 which is fastened to the right-hand side of the base 1 by the screw 4 and is of sufficient width to overlap the side of the slot in which the type-bar guide rests, serves to hold that side of the jig against the guide 2. The plate 3 is also held against the base by the screw 5 which also serves to hold the member 6 which, as shown in Fig. 3 is held against the head of the screw by the spring 7. The member 6 is intended to hold the type-bar between the jaws of the guide during the operation of soldering the type-pallet to the type-bar, the manner of doing which will be later described. At the left hand side of the base 1 is a knurled headed screw 8, which, as shown in Fig. 4 makes a wedging contact with the other side of the type-bar guide and thereby serves to hold the jig at any desired vertical position upon the type-bar guide 2.

On the back of the base 1 is a smaller slot, shown in Fig. 3 into which fits a small, movable plate 9 the upper end of which is cut and shaped as shown clearly in Fig. 2 to fit the type-pallet of a teletypewriter. This plate is fitted with two knurled screws 10 and 11, screw 11 being designed and adapted to provide for slight tilting adjustments to the plate so as to give the type-pallet the proper position to conform to the platen of the teletypewriter. The upper screw 10 which extends through a slot 12 in the plate 9, which permits the vertical adjustment of the plate, serves as a locking screw for it.

The manner in which this jig is employed to effect the proper positioning of the type-pallet prior to the soldering operation is as follows:

The type-basket is removed from the teletypewriter and the jig is slipped over the type-bar guide 2 which is attached to the frame of the teletypewriter in the manner clearly shown in Fig. 1 of the patent to Morton et al. No. 1,904,164 dated April 18, 1933. The base 1 is securely fastened in place on the guide 2 by tightening the screw 8. Then the master "N" is inserted in the type-basket and the type-bar 13 is brought up to the position of the jig, between the jaws of the guide 2, and the sliding pallet locating plate 9 is adjusted to fit exactly the contour of the type-pallet 14. As shown in Fig. 2, the plate 9 may be tilted at the top by the manipulation of the bottom screw 11 in order to simulate the slope of the platen of the teletypewriter. The plate 9 is then firmly locked in position by the combined action of screws 10 and 11, the lower screw 11 being set first. The locating plate 9 is now in position to properly locate other pallets which are to be replaced.

To place a new pallet upon a given type-bar from which the old one has been removed, that bar is brought to the position of the jig, and the new pallet is slipped over the end of the type-bar, as shown in Fig. 4, and is adjusted to fit exactly the contour of the pallet locating plate 9 of the jig. When so adjusted the type-bar and the pallet are locked firmly by swinging the spring-member 6 around to a position where it will press against the type-bar. The pallet may then be soldered to the bar. It is advantageous to place the type-basket on its side, since, by doing so, the pallet to be soldered will be in a horizontal position thereby permitting the applied solder to flow smoothly and evenly into the joint between the pallet and the type-bar.

While this invention has been described in its application to the alignment of type-pallets upon a teletypewriter it is not so limited since, obviously, it may be employed in adjusting type-pallets upon any form of typewriting machine in which a removable type-pallet is to be fastened to a type-bar.

This invention, while disclosed in a specific form and arrangement of parts is capable of embodiment in other and different forms without departing from the spirit and scope of the appended claims.

What is claimed is:

1. A device for aligning a group of the type-pallets of a typewriter, each of which has thereon two characters which are spaced apart, the distance between the lower edge of the upper character and the upper edge of the lower character being the same for all of a given group of pallets, the said device including a base adapted to fit over the type-bar guide of the typewriter, and means connected to the said base to effect the alignment, the said means comprising a plate, the upper end of which is shaped to conform to the space between the said edges of the character upon the face of each type-pallet of a group when such pallet is held within the said type-bar guide.

2. The invention defined by claim 1 further characterized by the inclusion of means to clamp the said base at any desired vertical position upon the said guide.

3. A device for aligning a group of the type-pallets of a teletypewriter each of which has thereon two characters which are spaced apart, the distance between the lower edge of the upper character and the upper edge of the lower character being the same for all of a given group of pallets, the said device including a base having a slot in the face thereof into which the type-bar guide of the teletypewriter is designed to fit, clamping means to hold the base fixedly at any desired vertical position upon the said guide, and a plate connected to the base to effect the alignment of the type-pallets, the upper portion of the said plate being shaped to fit the contour of the face of each type-pallet of a given group.

4. The invention defined in claim 1 further characterized by means to adjust the degree of tilt of the plate to conform to the contour of the platen of the teletypewriter upon which the type-pallet will be impressed.

5. A device for aligning a group of the type-pallets of a teletypewriter each of which has thereon two characters which are spaced apart, the distance between the lower edge of the upper character and the upper edge of the lower character being the same for all of a given group of pallets, the said device comprising a slotted base for adjustable connection with the type-bar guide of the teletypewriter, means to fasten the base to the guide at any desired vertical point of adjustment, means attached to the back of the base having its upper end shaped to conform to the contour of the face of a type-pallet positioned upon a type-bar lying between the jaws of the type-bar guide and means to hold the said type bar securely within the jaws of the said guide.

6. A device for aligning a group of the type-pallets of a typewriter each of which has thereon two characters which are spaced apart, the distance between the lower edge of the upper character and the upper edge of the lower character being the same for all of a given group of pallets, the said device including a base having a slot in the face thereof into which the type-bar guide of the typewriter is designed to fit, and means connected with the base and coacting with the guide to hold the base and the guide rigidly in any desired relative vertical position, the said base having a tiltable plate positioned in a slot in the back of the base, a portion of the face of the plate being shaped to fit the contour of the face of a type-pallet, and means to adjust the degree of tilt of the said plate.

7. A device for aligning a group of the type-pallets of a typewriter each of which has thereon two characters which are spaced apart, the distance between the lower edge of the upper character and the upper edge of the lower character being the same for all of a given group of pallets, the said device including a base adapted for adjustable connection with the type-bar guide of a typewriter, means associated with the base to fixedly maintain the base and guide in any desired relative vertical position, and a tiltable plate attached to the said base, the upper part of said plate being shaped to conform to the contour of the face of a type-pallet, and means to tilt the said plate backward or forward to any desired position and to hold the plate in such position.

8. A device for aligning a group of the type-pallets of a typewriter each of which has thereon two characters which are spaced apart, the distance between the lower edge of the upper character and the upper edge of the lower character being the same for all of a given group of pallets, the said device including a base having a slot therein to effect a slidable connection of the base to the type-bar guide of a typewriter, means associated with the base and adapted to coact with the said guide to maintain the base and guide in any desired relative vertical position, and a pallet locating plate also connected to the said base and adapted to coact with the type-pallets to effect their alignment and means connected with the said plate to tilt the said pallets forward or backward, as desired, and to fixedly hold the plate in any desired position.

9. A device for aligning a group of the type-pallets of a typewriter each of which has thereon two characters which are spaced apart, the distance between the lower edge of the upper character and the upper edge of the lower character being the same for all of a given group of pallets, the said device including a base having a slot therein to effect a slidable connection of the base to the type-bar guide of a typewriter, means associated with the base and adapted to coact with the said guide to maintain the base and guide in any desired relative vertical position, the said base also having another slot located in the side thereof opposite to that in which the first mentioned slot is located, a pallet locating plate positioned in the said other slot, the said plate having a screw therein to provide a pivotal point and another screw also in said plate and adapted to press against said base to effect the desired degree of tilt to the said plate, the said first mentioned screw being adapted to lock the plate in the desired position.

WALTER GUSTAV CELVA.

REFERENCES CITED

The following references are of record in the file of this patent:

UNITED STATES PATENTS

| Number | Name | Date |
| --- | --- | --- |
| 1,608,015 | Brandt | Nov. 23, 1926 |
| 1,890,659 | Thorell | Dec. 13, 1932 |